(12) United States Patent
Hashizume et al.

(10) Patent No.: US 6,415,072 B1
(45) Date of Patent: Jul. 2, 2002

(54) OPTICAL WAVELENGTH MULTIPLEXING AND DIVIDING DEVICE

(75) Inventors: Naoki Hashizume; Hiroyuki Koshi; Takeshi Nakajima; Kanji Tanaka, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/543,590

(22) Filed: Apr. 5, 2000

Related U.S. Application Data

(63) Continuation of application No. PCT/JP99/05140, filed on Sep. 21, 1999.

(30) Foreign Application Priority Data

Sep. 25, 1998 (JP) .......................................... 10-288884

(51) Int. Cl.$^7$ .............................. G02B 6/28; G02B 6/34
(52) U.S. Cl. ......................................... 385/24; 385/37
(58) Field of Search ..................... 385/24, 37; 359/159, 359/163

(56) References Cited

U.S. PATENT DOCUMENTS

| | | | |
|---|---|---|---|
| 4,786,131 A | 11/1988 | Mahapatra et al. | 350/96 |
| 5,136,671 A | 8/1992 | Dragone | 385/46 |
| 5,412,744 A * | 5/1995 | Dragone | 385/24 |
| 5,706,377 A * | 1/1998 | Li | 385/37 |
| 5,940,555 A | 8/1999 | Inaba et al. | 385/24 |
| 5,982,960 A * | 11/1999 | Akiba et al. | 385/24 |
| 6,049,644 A * | 4/2000 | Dragone | 385/37 |
| 6,141,467 A * | 10/2000 | Doerr | 385/24 |

FOREIGN PATENT DOCUMENTS

| | | | |
|---|---|---|---|
| JP | 9-49936 | 2/1997 | G02B/6/122 |
| JP | 9-73018 | 3/1997 | G02B/6/12 |

OTHER PUBLICATIONS

Uetsuka et al., Novel 1×N guided–wave multi–demultiplexer for FDM, Feb. 26, 1995, p. 76–77, Optical Fiber Communication, XP002039226, IEEE, New York.

* cited by examiner

Primary Examiner—Hemang Sanghavi
Assistant Examiner—Scott Knauss
(74) Attorney, Agent, or Firm—Lacasse & Associates, LLC

(57) ABSTRACT

The present invention relates to an optical wavelength multiplexing and dividing device of an array waveguide type diffraction lattice, which is capable of separating and picking up wavelength-multiplexed signals of various wavelengths, which are used in optical transmissions. An input side slab waveguide (3), a plurality of juxtaposed array waveguides (4), an output side slab waveguide (5) and a plurality of optical output waveguides (6) are connected, in order, to the outgoing sides of a plurality of optical input waveguides (2), thereby forming a waveguide pattern. The array waveguides (4) are formed so as to have lengths different from each other to cause the phases of individual lights to be deviated after propagating through the respective array type waveguides (4), wherein different lights as per wavelength are condensed at the incident ends (7) of optical output waveguides 6 by passing through the output side slab waveguides (5) and are outputted through the optical output waveguides (6). The incident ends (7a) of the optical output waveguides (6) are provided at a light condensing predicted position of lights of the respective wavelengths where the lights are predicted to be condensed through the output side slab waveguide (5), and the incident ends (7b) of the optical output waveguides (6) are provided at a light condensing prediction corrected position where the light condensing position is shifted with respect to the light condensing predicted position.

8 Claims, 7 Drawing Sheets

FIG. 3
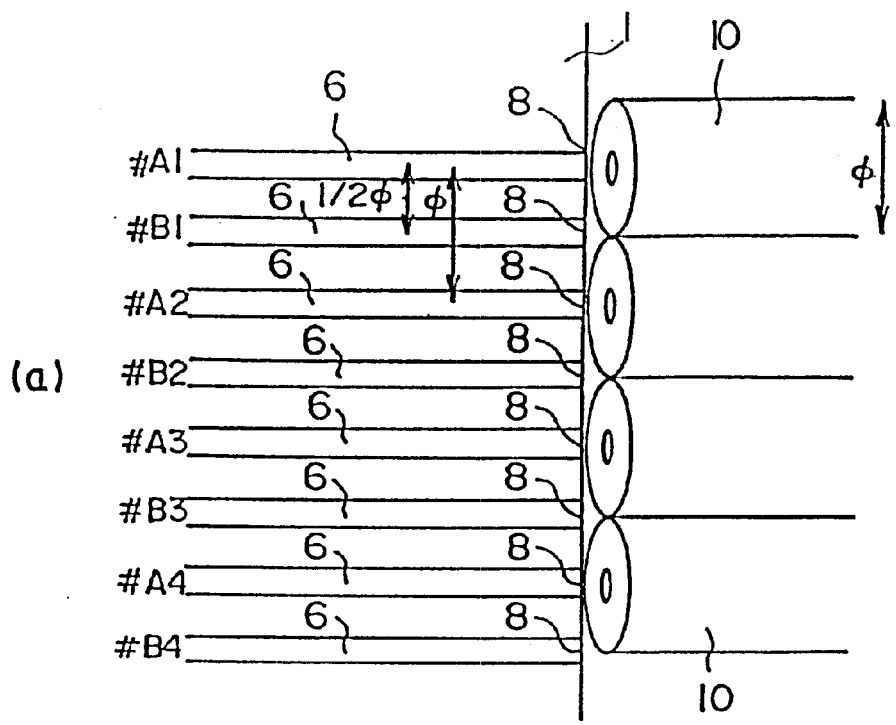
(a)
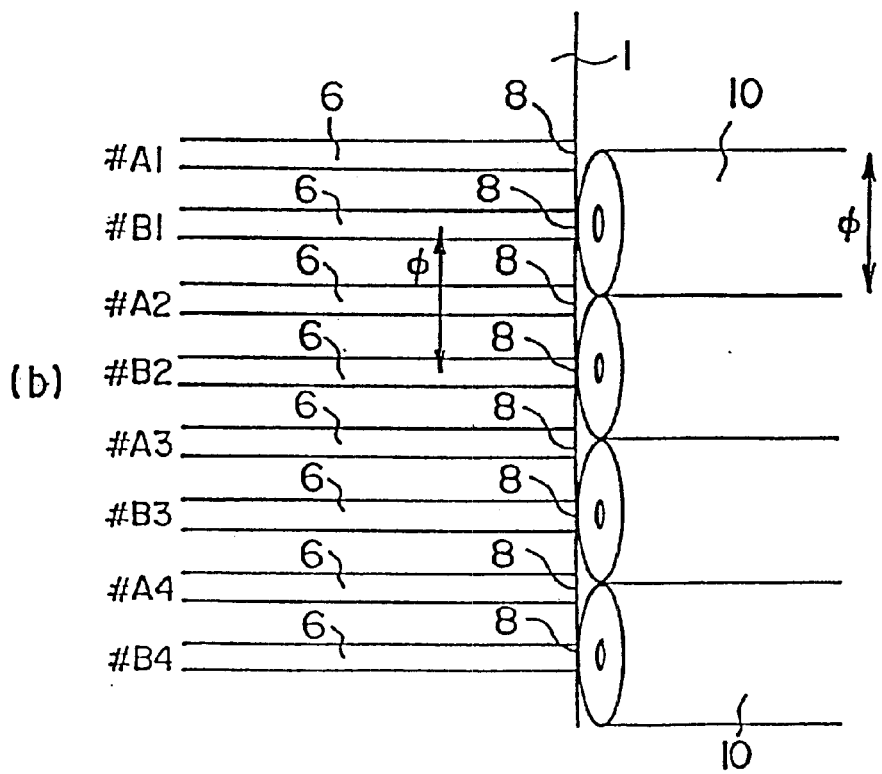
(b)

FIG. 6
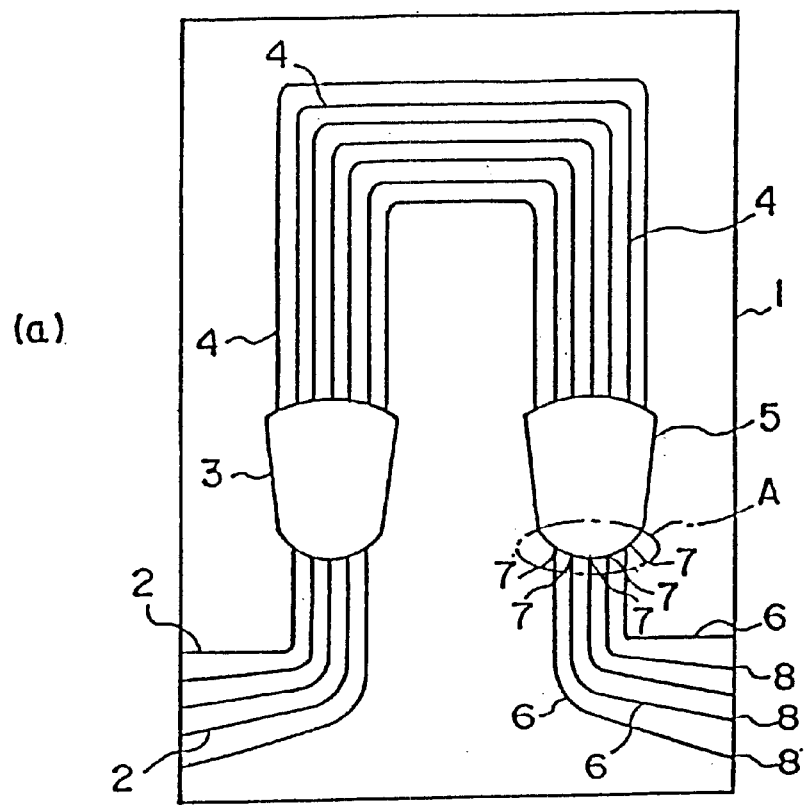
(a)
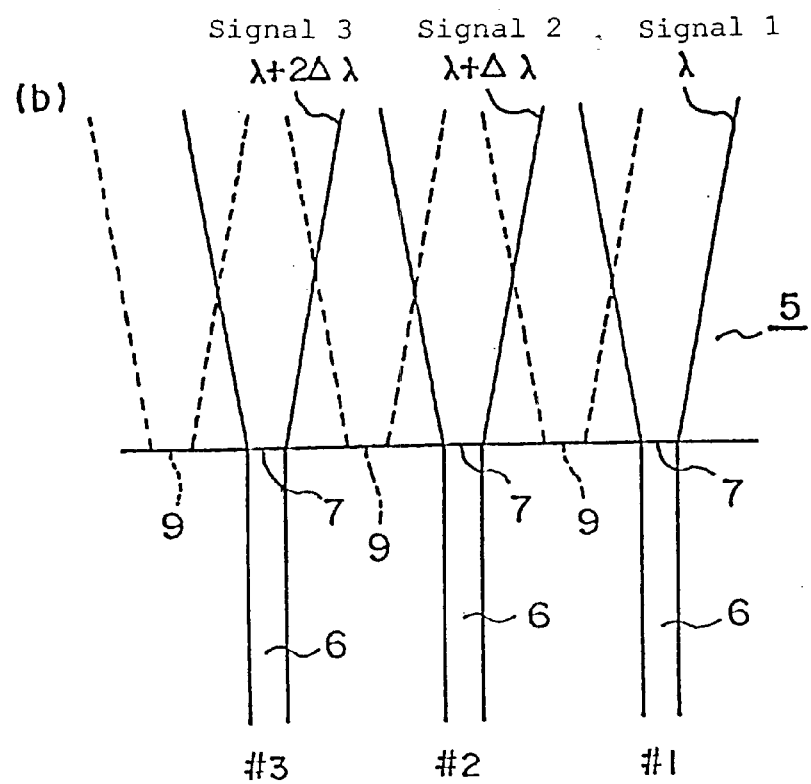
(b)

OPTICAL WAVELENGTH MULTIPLEXING AND DIVIDING DEVICE

This application is a continuation of PCT/JP99/05140 filed Sep. 21, 1999.

TECHNICAL FIELD

The present invention relates to an optical wavelength multiplexing and dividing device that is used in, for example, an optical wavelength multiplex transmission. Background of the invention.

Recently, in a wavelength multiplex optical transmission system, an attempt has been carried out, in which the number of optical transmissions is increased by increasing the degree of multiplex in wavelengths. In order to achieve the objective, it is necessary to prepare an optical wavelength multiplexing and dividing device that is able to multiplex and divide a plurality of signal lights whose wavelength interval is 1nm or less. For example, in a wavelength multiplexed transmission at a wavelength band of 1.55 $\mu$m, an optical wavelength multiplexing and dividing device is demanded, which is able to multiplex and divide a plurality of signal lights whose wavelength interval is 0.8 nm (100 GHz interval in terms of frequency).

A diffraction grating is available as an example of the optical wavelength multiplexing and dividing device. In an optical wavelength multiplexing and dividing device in which a prior art diffraction grating is employed, there is a limitation in the number of diffractions that can be used, wherein sufficient dispersion cannot be obtained. Therefore, although it was impossible to decrease the wavelength interval to 1 nm or less, Japanese Laid-Open Patent Publication No. 65588-1989 proposed an optical wavelength multiplexing and dividing device which improves the wavelength resolution by using an array type waveguide diffraction grating as a diffraction grating and can narrow the wavelength interval.

As shown in FIG. 6(a), the proposed optical wavelength multiplexing and dividing device has a waveguide chip in which a waveguide pattern is formed on a substrate 1. The optical wavelength multiplexing and dividing device is constructed as follows; that is, the abovementioned waveguide pattern is composed so the input type slab waveguide 3 which functions as a first slab waveguide is connected to the outgoing side of optical input waveguides 2 juxtaposed in a plurality, a plurality of juxtaposed array waveguides 4 are connected to the outgoing side of the input side slab waveguide 3, an output side slab waveguide 5 which functions as a second slab wave guide is connected to the outgoing side of a plurality of array waveguides 4, and a plurality of juxtaposed optical output waveguides 6 are connected to the outgoing side of the output side slab waveguide 5.

The array waveguides 4 are composed so as to have different lengths from each other, and propagate light introduced from the input side slab waveguide 3. In addition, the optical input waveguides 2 and optical output waveguides 6 are provided so as to correspond to the number of a plurality of signal lights having different wavelengths from each other, which are divided by, for example, an optical wavelength multiplexing and dividing device. Although the array waveguides 4 are usually provided in a plurality, for example, 100 in number, the number of these respective waveguides 2, 4 and 6 is simply illustrated in FIG. 6(a) for the sake of simplification of the drawing.

Transmission side optical fibers (not illustrated) are connected to the optical input waveguides, in which wavelength-multiplexed light is introduced. The light introduced through the optical input waveguides 2 into the input side slab waveguide 3 is widened by its diffraction effect and is made incident into a plurality of array waveguides 4 for propagation therein. The light propagated in the respective array waveguides 4 reaches the output side slab waveguide 5, wherein the light is condensed and outputted into the optical output waveguides 6. In the light propagation, since the lengths of the respective array waveguides 4 are different from each other, a deviation in the individual optical phases arises after the light propagates in the respective array type waveguides 4, whereby the wave plane of the converged light is inclined in line with the deviation amount, and the angle of inclination determines a light condensing position. Therefore, by forming the optical output waveguides 6 at the light condensing position, light having different wavelengths can be outputted wavelength by wavelength from the optical output waveguides 6.

For example, as shown in FIG. 6(b), a signal (signal light) 1, having a wavelength $\lambda$, which is condensed through the output side slab waveguide 5 is condensed at the incident ends 7 of the output side waveguides 6 shown with a mark #1, and a signal 2 having a wavelength ($\lambda+\Delta\lambda$), which is condensed through the output side slab waveguide 5 is condensed at the incident ends 7 of the output side waveguides 6 shown by a mark #2. A signal 3 having a wavelength ($\lambda+2\Delta\lambda$), which is condensed through the output side slab waveguide 5 is condensed at the incident ends 7 of the output side waveguides 6 shown by a mark #3. Thus, light is made incident from the respective input ends 7 into the optical output waveguides 6, and is outputted from the outgoing ends 8 of the optical output waveguides 6 through the respective optical output waveguides 6.

Therefore, as shown in FIG. 7, by connecting optical fibers 10 for optical output to the outgoing ends 8 of the respective optical output waveguides 6, it is possible to separate and pick up light of the abovementioned respective wavelengths through the optical fibers. Further, in the above-mentioned optical wavelength multiplexing and dividing device, the arraying pitch Ø of the outgoing ends 8 of the optical output waveguides 6 is formed to be approx. 250 $\mu$m, which is equal to the diameter Ø of the optical fibers 10 so that the optical fibers 10 can be easily connected to the outgoing ends 8 of the optical output waveguides 6. And the arraying pitch of the outgoing ends 8 of the optical output waveguides 6 is formed greater than that of the incident ends 7 of the optical output waveguides 6.

In an optical wavelength multiplexing and dividing device of the array type waveguide diffraction grating, since the wavelength resolution is proportional to a difference ($\Delta$L) in length of the respective array waveguides 4 which constitute diffraction gratings, it becomes possible to multiplex and divide wavelength-multiplexed light of a narrow wavelength interval, which could not be achieved by any prior art diffraction grating, by designing the $\Delta$L to be a large value.

However, in an optical wavelength multiplexing and dividing device of such an array waveguide diffraction grating, a deviation arises in the wavelength characteristics of an optical wavelength multiplexing and dividing device due to unevenness in the film thickness of a produced waveguide pattern, waveguide widths, refractive index, etc. If such a deviation occurs, signal light of the respective wavelengths, which is condensed through the output side slab waveguide 5, is not normally condensed at the incident ends 7 of the optical output. waveguides 6 shown at, for example, #1, #2 and #3, and the light is condensed at a deviated position shown at 9 in FIG. 6(b). The deviation of the condensing position reaches ±0.5 nm or so at most in terms of wavelength, wherein since light of the respective wavelengths is condensed at a position far from the incident ends 7 of the optical output waveguides 6, it is impossible to make the light of the respective wavelengths into the optical output waveguides 6.

In addition, as a means for reducing the problem of the deviation in wavelengths divided by such an optical wavelength multiplexing and dividing device, such a method is proposed, which shifts a wavelength condensed at the incident ends 7 of the optical output waveguides 6 by combining a temperature controlling device to a waveguide chip and utilizing a temperature dependency of the refractive index of a material which forms an optical waveguide. However, if this method is used, since it is possible to control a passing wavelength in only a remarkably narrow range of, for example, ±0.05 nm, an optical wavelength multiplexing and dividing device, in which the wavelength to be divided deviates beyond the range, becomes defective. Therefore, even though such a method is used, an optical wavelength multiplexing and dividing device in which such an array waveguide diffraction grating is utilized has a low yield rate in production, and this results in an increase in production cost of an optical wavelength multiplexing and dividing device using such an array waveguide diffraction grating, and this becomes a factor by which practical application thereof is suppressed.

The present invention was developed in order to solve the abovementioned problems and shortcomings, and it is therefore an object of the invention to provide an optical wavelength multiplexing and dividing device which scarcely becomes defective even though a deviation arises in the wavelength characteristics resulting from unevenness in production, thereby improving the production yield ratio thereof.

DISCLOSURE OF THE INVENTION

In order to achieve the above object, the present invention is featured in that the optical wavelength multiplexing and dividing device is constructed as follows; That is, the first aspect of the invention is an optical wavelength multiplex and dividing device which has a waveguide pattern, in which a first slab waveguide is connected to the outgoing side of optical input waveguides juxtaposed in a plurality, a plurality of juxtaposed array waveguides, having different lengths from each other, which propagate light taken out from the first slab waveguide, are connected to the outgoing side of the first slab waveguide, a second slab waveguide is connected to the outgoing side of the plurality of array waveguides, and a plurality of juxtaposed optical output waveguides are connected to the outgoing side of the second slab waveguide, wherein a plurality of optical signals, having different wavelengths from each other, which are inputted from the optical input waveguides are caused to propagate with deviations in phase given wavelength by wavelength by the array waveguides, are made incident into optical output waveguides having different wavelengths from each other for each of the wavelengths, and are outputted from optical output waveguides having different wavelengths from each other, wherein the respective incident ends of the plurality of optical output waveguides are provided at a predicted light condensing position of light of the respective wavelengths which are predicted to be condensed through the above second slab waveguide, and a predicted light condensing correcting position where the light condensing position is deviated with the abovementioned light condensing predicted position.

Further, the second aspect of the invention is featured in that, in addition to the construction according to the first aspect, an arraying pitch of the outgoing ends of optical output waveguides is made one fractional plurality with respect to the diameter o optical fibers connected to the outgoing end side of the optical output waveguides, and the corresponding optical fibers are connected to an alternative plurality of the optical output waveguides or several alternatives thereof.

In addition, the third aspect of the invention is featured in that, in addition to the abovementioned first and second constructions, where optical output waveguides secured at the abovementioned light condensing predicted position are made into the first optical output waveguides, and the optical output waveguides secured at the light condensing prediction corrected position are made into the second optical output waveguides, the incident ends of these first and second optical output waveguides are alternately provided at equal intervals.

Further, the fourth aspect of the invention is featured in that, in addition to the first or second construction, where optical output waveguides secured at the abovementioned light condensing predicted position are made into the first optical output waveguides, and the optical output waveguides secured at the light condensing prediction corrected position are made into the second optical output waveguides, these first and second optical output waveguides are alternately provided while the incident ends of the first optical output waveguides are arrayed at equal pitches and the incident ends of the second optical output waveguides are also arrayed at equal pitches, the interval between the incident ends of the first optical output waveguides and the incident ends of the second optical output waveguides which are located at one side adjacent to the corresponding first optical output waveguides is made different from the interval between the incident ends of the first optical output waveguides and those of the second optical output waveguides located at the other side adjacent to the corresponding first optical output waveguides.

Further, the fifth aspect of the invention is featured in that, in addition to the first or second construction, where the optical output waveguides secured at the abovementioned light condensing predicted position are made into the first optical output waveguides, and the optical output waveguides secured at the light condensing prediction corrected position are made into the second optical output waveguides, the respective incident ends of the first optical output waveguides are arrayed at equal pitches, and a plurality of the second optical output waveguides are arrayed in the pitches of the corresponding first optical output waveguides.

In the invention thus constructed, the respective incident ends of a plurality of optical output waveguides are provided at the light condensing predicted position of the respective wavelengths where light is predicted to be condensed through the second slab waveguides after the light is given a phase deviation for each of the wavelengths and is caused to propagate by the array waveguides, and at the light condensing prediction corrected position where the light condensing position is deviated with respect to the light condensing predicted position.

Therefore, according to the invention, for example, when the film thickness of the waveguide pattern, waveguide widths, refractive index, etc., are produced almost as per design, light of the respective wavelengths, which is condensed through the second slab waveguides can be made incident into the optical output waveguides having the incident ends formed at the light condensing predicted position. On the other hand, where the film thickness of the waveguide pattern, waveguide width, refractive index, etc., are not produced as per design, and a deviation occurs in the wavelength characteristics of an optical wavelength multiplexing and dividing device, light of the respective wavelengths can be made incident into optical output waveguides having the incident ends formed at the light condensing prediction corrected position, depending on the amount of deviation.

As described above, by selectively connecting optical fibers, etc., to the output ends of either the optical output waveguide of the light condensing predicted position or the light condensing prediction corrected position and picking up light outputted through the optical output waveguides, the probability of picking up light of the respective wavelengths, which is condensed through the second slab waveguides, through the optical output waveguides can be improved.

Therefore, according to the present invention, even though a deviation in the wavelength characteristics results from unevenness in production, the products scarcely become defective, whereby the production yield ratio can be further improved.

In addition, in such a structure where the arraying pitch of the outgoing ends of optical output waveguides can be formed to one fractional plurality with respect to the diameter of optical fibers connected to the outgoing end side of the corresponding waveguides, when connecting optical fibers to the outgoing end side of the optical output waveguides, the optical fibers are, as a whole, positioned in relation to the optical output waveguides as optical fiber arrays, wherein, for example, by causing these optical fiber arrays to slide as a whole, it is possible to connect the optical fibers to an alternative plurality of the optical output waveguides or to several alternatives of optical output waveguides. Therefore, the optical fiber connection to the optical output waveguides can be further facilitated, wherein it becomes possible to easily form an optical wavelength multiplexing and dividing device.

Further, in such a construction in which the incident ends of the first and second optical output waveguides are alternately provided at equal pitches where optical output waveguides secured at the light condensing predicted position are made into the first optical output waveguides and optical output waveguides secured at the light condensing prediction corrected position are made into the second optical output waveguides, it is possible to very easily form an optical wavelength multiplexing and dividing device, which brings various excellent effects described above.

Further, if the arraying pattern of the optical output waveguides is made so that the incident ends of the first and second optical output waveguides are alternately provided at equal pitches where optical output waveguides secured at the light condensing predicted position are made into the first optical output waveguides and optical output waveguides secured at the light condensing prediction corrected position are made into the second optical output waveguides, it is possible to very easily form an optical wavelength multiplexing and dividing device, which brings various excellent effects described above.

In addition, in such a construction where the incident ends of the first optical output waveguides are arrayed at equal pitches with the first and second output waveguides alternately provided, the incident ends of the second optical output waveguides are arrayed at equal pitches, and the intervals between the incident ends of the first optical output waveguides and the incident ends of the second optical output waveguides adjacent to the first optical output waveguides are made different from each other, an optical wavelength multiplexing and dividing device can be regarded as a "passed product" in both a case where the light condensed through the second slab waveguide is deviated to the incident end side of the second optical output waveguide at one side adjacent to the first optical output waveguide, a case where the light is deviated to the incident end side of the optical output waveguide at the other side adjacent to the first optical output waveguides if the light is deviated from the first optical output waveguides. Therefore, it is possible to further decrease the ratio at which optical wavelength multiplexing and dividing devices become defective even though a deviation in the wavelength characteristics results from unevenness in production. Therefore, the production yield ratio thereof can be further improved.

Further, in a construction where the incident ends of the first optical output waveguides are alternately arrayed at equal pitches and a plurality of the second optical output waveguides are arranged in the pitches of the corresponding optical output waveguides, the optical wavelength multiplexing and dividing device can be made into a "passed product" even in a case where the light condensed through the second slab waveguide is deviated to either of the second optical output waveguides between the pitches of the first optical output waveguides. Therefore, even though a deviation in the wavelength characteristics results from unevenness in production, the ratio at which the products become defective can be further reduced, and the production yield thereof can be further improved.

BRIEF DESCRIPTION OF THE DRAWINGS

FIG. 3 is an explanatory view showing a method for connecting optical fibers for optical output to an optical wavelength multiplexing and dividing device according to the first preferred embodiment, FIG. 6 is an explanatory view of a prior art array waveguide diffraction circuit, wherein (a) is an explanatory view of a construction of an optical waveguide multiplexing and dividing device, and (b) is an explanatory view of actions.

BEST MODE FOR CARRYING OUT THE INVENTION

In order to describe the present invention in detail, a description is given of preferred embodiments with reference to the accompanying drawings. Further, in the following description of the preferred embodiments, parts which are identical to or equivalent to those in the prior art example are given the same reference numbers, and an overlapping description is omitted for simplification. FIG. 1(a) shows a construction of the major parts of the first preferred embodiment of an optical wavelength multiplexing and dividing device according to the invention, and (b) is an enlarged view of an ellipse A shown by a broken line in FIG. 1(a). The preferred embodiment is constructed as in an optical wavelength multiplexing and dividing device of the prior art example, and a feature that the preferred embodiment differs from the prior art example is that input ends 7 of an optical output waveguides are provided at both a light condensing predicted position of light of the respective wavelengths, which is predicted to be condensed through the output side slab waveguide 5, and a light condensing prediction corrected position where the light condensing position is deviated with respect to the light condensing predicted position.

Figure 1:
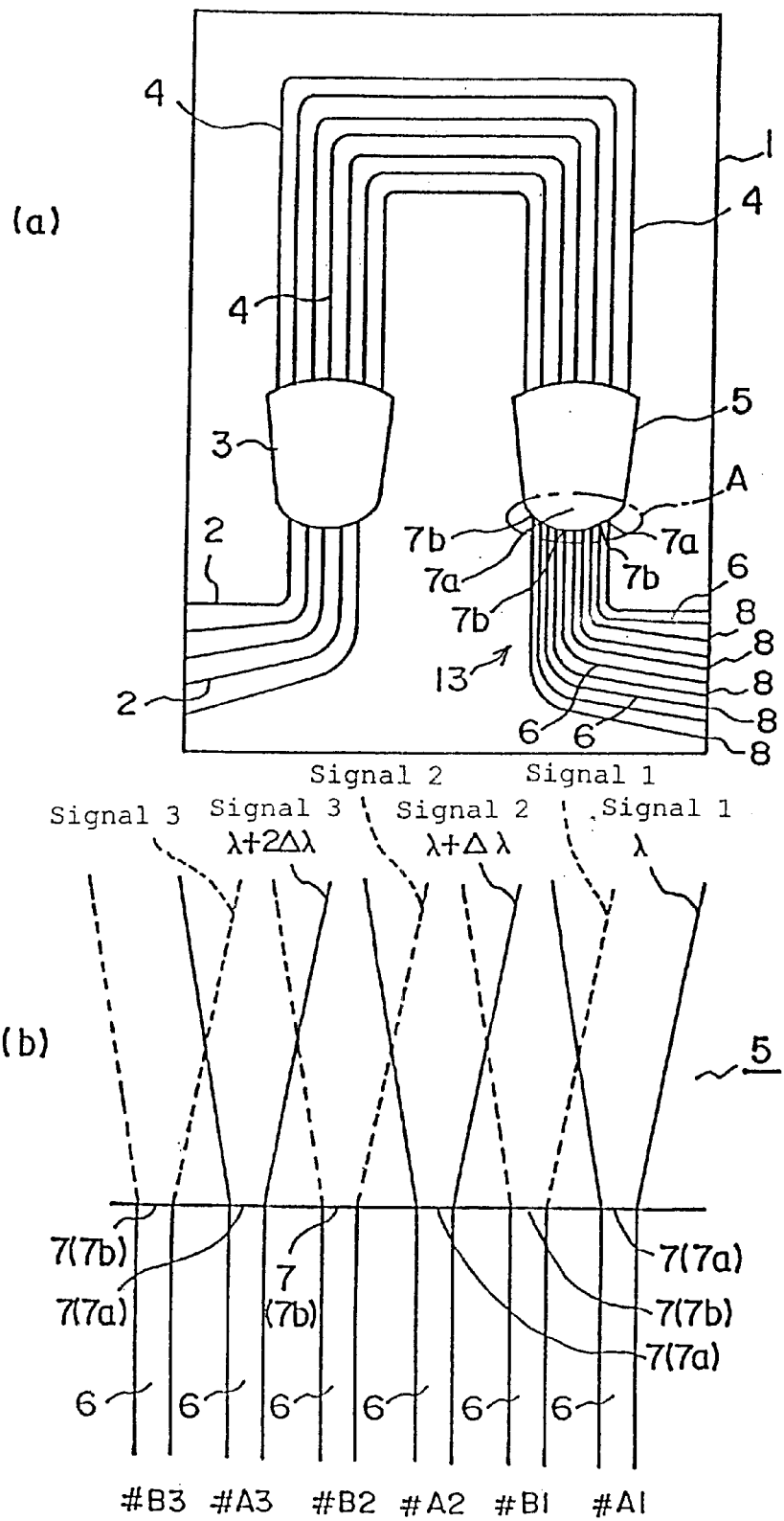
FIG. 1 is an explanatory view of a first preferred embodiment of an optical wavelength multiplexing and dividing device according to the present invention, wherein (a) is a construction view showing the major parts of the optical wavelength multiplexing and dividing device, and (b) is an explanatory view of actions of the optical wavelength multiplexing and dividing device.

Further, in FIG. 1, input ends 7a are formed at the light condensing predicted position, and input ends 7b are formed at the light condensing prediction corrected position. The optical output waveguides 6 having the input ends 7a are similar to optical output waveguides 6 formed in an optical wavelength multiplexing and dividing device of the prior art example. In the preferred embodiment, the second optical output waveguides 6 (#B1, #B2, #B3, ...) having input ends 7b are provided with spacing between the first optical output waveguides 6 (#A1, #A2, #A3, ...) which are formed similar to the optical output waveguides of the prior art example, having input ends 7a.

Figure 2:
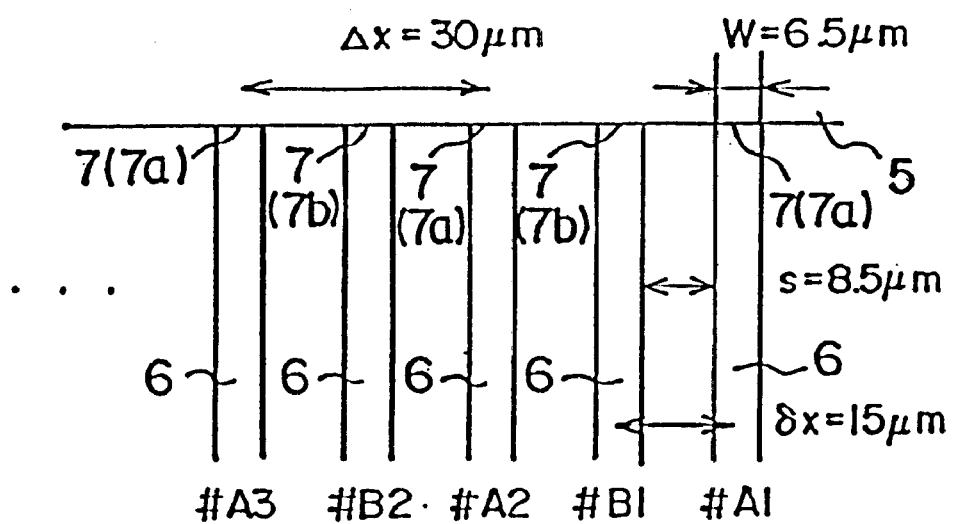
FIG. 2 is an explanatory view showing the array conditions of optical output waveguides 6 in the first preferred embodiment of an optical wavelength multiplexing and dividing device according to the invention.

As shown in FIG. 2, in the preferred embodiment, the widths W of the respective optical output waveguides 6 are 6.5 μm, and the incident ends 7a of the first optical output waveguides 6 (#A1, #A2, #A3, ...) and incident ends 7b of the second optical output waveguides 6 (#B1, #B2, #B3, ...) are alternately arrayed at equal pitches, wherein the array pitch δx is 15 μm. In addition, the interval s between the incident ends 7a of the first optical output waveguides (#A1, #A2, #A3, ...) and the incident ends 7b of the second optical output waveguides 6 (#B1, #B2, #B3, ...) is 8.5 μm. Further, the array pitch Δx of the incident ends 7a of the first optical output waveguides is 30 μm.

It is designed that a signal 1 of wavelength $\lambda$, signal 2 of wavelength $(\lambda+\Delta\lambda)$ and signal 3 of wavelength $(\lambda+2\Delta\lambda)$ are made incident into the incident ends 7a of the first optical output waveguides 6 (#A1, #A2, #A3, ...), and further signal light of a wavelength $[\lambda+(n-1)\Delta\lambda]$ is made incident into the incident end 7a of the first optical output waveguide 6 (#An). In addition, it is designed that signal light of wavelength $(\lambda+0.5\lambda)$, signal light of wavelength $(\lambda+1.5\lambda)$ and signal light of wavelength $(\lambda+2.5\Delta\lambda)$ are made incident into the incident ends 7b of the second optical output waveguides 6 (#B1, #B2, #B3, ...), and further signal light of wavelength $[\lambda+\{(n-1)+0.5\}\Delta\lambda]$ is made incident into the incident end 7b of the first optical output waveguide 6 (#Bn) (wherein n is an integral number). Further, in order to match the demanded requirements in an optical wavelength multiplexing and dividing device in wavelength multiplex transmissions of 1.55 μm wavelength band, Δλ is designed to be 0.8 nm.

The interval between the optical output waveguides adjacent to each other is formed equal at a section from the input ends 7 (7a and 7b) to the bending corner 13, and the interval between mutually adjacent optical output waveguides 6 is formed so as to be gradually widened from the bending corner 13 of the optical output waveguides 6 toward the outgoing ends 8. And, as shown in FIG. 3, the array pitch of the outgoing ends 8 of the optical output waveguides 6 is caused to be a value which is one half the diameter φ of optical fibers connected to the outgoing ends 8, that is, approx. 125 μm. The pitch of the outgoing ends 8 of the first optical output waveguides 6 (#A1, #A2, #A3, #A4, ...) is made into approx. 250 μm, and at the same time, the pitch of the outgoing ends of the second optical output waveguides 6 (#B1, #B2, #B3, #B4, ...) is made into approx. 250 μm.

The preferred embodiment is constructed as described above. In the preferred embodiment as in the prior art example, optical fibers at the transmission side are connected to the optical input waveguides 2 so that wavelength multiplexed light can be introduced. And, the light introduced into the input side slab waveguide 3 through the optical input waveguides 2 is widened by the diffraction effect and is made incident into a plurality of array waveguides 4, whereby the light propagates in the respective array waveguides 4, deviations arise in the phase of the respective light, and the light is condensed through the output side slab waveguide 5.

And, in this preferred embodiment, for example, as shown in FIG. 1(b), if the film thickness of the waveguide pattern, waveguide width and refractive index, etc., are made as per design, the signal 1 of wavelength $\lambda$ condensed through the output side slab waveguide 5 is condensed at the incident ends 7 of the output side waveguide 6 shown at #A1, the signal 2 of wavelength $(\lambda+\Delta\lambda)$ is condensed at the incident end 7 of the output side waveguide 6 shown at #A2, and the signal 3 of wavelength $(\lambda+2\Delta\lambda)$ is condensed at the incident ends 7a of the output waveguide 6 shown at #A3. Thus, light of the respective wavelengths is condensed at the incident ends 7a of the first optical output waveguides 6 (#A1, #A2, #A3, ...) and outputted through the first optical output waveguides 6 (#A1, #A2, #A3, ...).

Further, where the film thickness of the waveguide pattern, waveguide width, refractive index, etc., are not made as per design and a deviation arises in the wavelength characteristics of an optical wavelength multiplexing and dividing device, signals 1, 2 and 3 of the respective wavelengths ($\lambda$, $\lambda+2\lambda$, $\lambda+2\Delta\lambda$) which are condensed through the output side slab waveguide 5 are further condensed at a light condensing position deviated from the input ends 7a of the optical output waveguides 6. Where the deviation of the abovementioned wavelength characteristics is approx. ±0.4 nm which is half or so of the Δλ (=0.8 nm), light of the respective wavelengths is condensed at the input ends 7b of the second optical output waveguides 6 (#B1, #B2, #B3, ...) so that the respective signals 1, 2, and 3 are condensed at the input ends 7b of the second optical output waveguides (#B1, #B2, #B3, ...), and the light is outputted through the second optical output waveguides 6(#B1, #B2, #B3, ...).

And, as shown in FIG. 3(a), when light is outputted through the first optical output waveguides 6(#A1, #A2, #A3, ...), the optical fibers 10 are connected to the outgoing ends 8 of the first optical output waveguides 6 (#A1, #A2, #A3, ...), and when the light is outputted through the second optical output waveguides 6 (#B1, #B2, #B3, ...), the optical fibers 10 are, as shown in the same drawing (B), connected to the outgoing ends 8 of the second optical output waveguides 6 (#B1, #B2, #B3, . . . ), whereby light of the respective wavelengths is picked up via the optical fibers.

According to the preferred embodiment, by providing the input ends 7 of the optical output waveguides at a light condensing predicted position (7a) of the respective wavelengths where light is predicted to be condensed through the output side slab waveguide and at a light condensing prediction corrected position (7b) in which the light condensing position is deviated with respect to the light condensing predicted position, it is possible to pick up light of the respective wavelengths from the optical wavelength multiplexing and dividing device where a deviation is ±0.4 nm or so in terms of wavelength when a deviation arises in the wavelength characteristics due to the film thickness, etc. of the waveguide pattern not being made as per design, and as a matter of course, where the film thickness, waveguide widths, refractive index, etc., of the waveguide pattern are made almost as per design. Therefore, the probability of picking up light via optical output waveguides can be further increased than in the prior art examples, whereby the ratio at which products become defective can be reduced even though a deviation arises, originating in unevenness in production, and the production yield ratio can be improved.

Further, as described above, such a method may be utilized, where a temperature control device is combined in a waveguide chip, and wavelengths to be condensed at the incident ends 7 of an optical output waveguides 6 is shifted by utilizing a temperature dependency of a refractive index in a material which forms optical waveguides. In this case, it is possible to correct the deviation in wavelengths within a range of ±0.05 nm. Accordingly, if this method is used for the preferred embodiment, signal light can be made☐incident into the incident ends 7a of the first optical output waveguides 6 when the deviation in wavelengths is within ±0.05 nm, and can be made incident into the incident ends 7b of the second optical output waveguides 6 if the deviation in wavelengths is within ±(0.4±0.05)nm.

Therefore, where the probability distribution of the amount of deviation due to unevenness in production of optical wavelength multiplexing and dividing devices is a normal distribution in which the standard deviation σ=0.2 nm, the probability (the probability at which optical wavelength multiplexing and dividing devices according to the preferred embodiment can pass as a "product") at which the signal light condensed through the output side slab waveguide 5 is made incident into the incident ends 7a and 7b of either of the first or the second optical output waveguides 6 becomes 25.3%. In comparison with the probability of 19.7% at which the prior art optical wavelength multiplexing and dividing devices can pass as "products" only when the deviation in the wavelengths is within 0.05 nm, the production yield ratio can be increased by 5.6%.

Further, according to the preferred embodiment, the array pitch of the outgoing ends 8 of the optical output waveguides 6 is made one-second of the diameter φ of optical fibers connected to the outgoing ends 8, whereby the pitch of the outgoing ends 8 of the first optical output waveguides 6 (#A1, #A2, #A3, . . . ) is approx. 250 μm, and the pitch of the outgoing ends 8 of the second optical output waveguides 6 (#B1, #B2, #B3 . . . ) is made into approx. 250 μm. Thus, either of the pitch of the outgoing ends 8 of the first optical output waveguides 6 or the pitch of the outgoing ends 8 of the second optical output waveguides is the value which is identical to the diameter of optical fibers connected to the outgoing ends 8 of the optical output waveguides 6, whereby as shown in FIG. 3, it is possible to very simply carry out connections of optical fibers 10 to the outgoing ends 8 of the optical output waveguides 6.

That is, by only shifting, by an adequate distance, the connection position of an optical fiber array provided with optical fibers 10 to be connected to an optical wavelength multiplexing and dividing device in the array direction of the outgoing ends 8 of the optical output waveguides 6 according to the situation, in detail, shifting the tip end side (connection end face side) of the optical fibers 10 approximately 125 μm, it is possible to very simply connect optical fibers 10 to an optical wavelength multiplexing and dividing device even where light is outputted from the first optical output waveguides 6 or from the second optical output waveguides 6.

Figure 4:
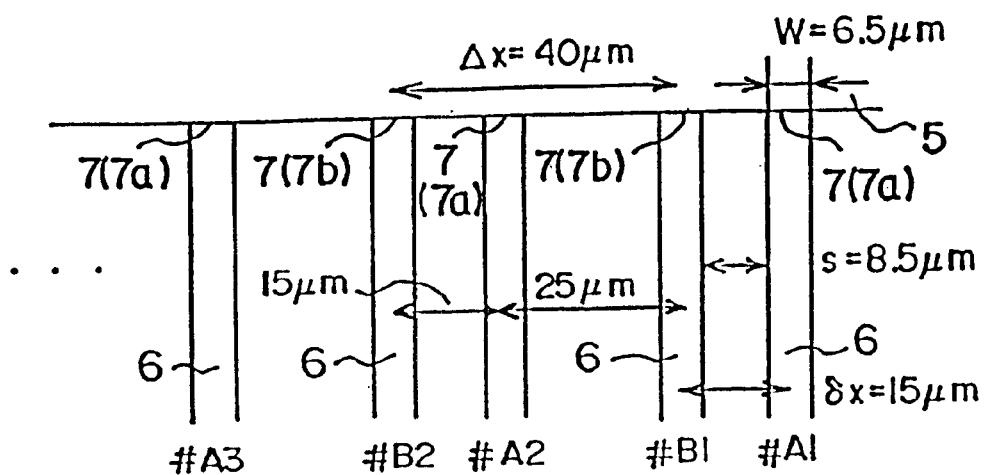
FIG. 4 is an explanatory view of the array conditions of an optical output waveguides 6 according to a second preferred embodiment of an optical output multiplexing and dividing device according to the invention.

Next, a description is given of the second preferred embodiment of an optical wavelength multiplexing and dividing device according to the present invention. The second preferred embodiment is constructed in almost the same manner as that of the first preferred embodiment. A feature in that the second embodiment is different from that of the first embodiment is, as shown in FIG. 4, the interval between the incident ends 7a of the first optical output waveguides 6 (for example #A2) and the incident ends 7b of the second optical output waveguides 6 (for example, #B2) adjacent to the first optical output waveguides 6 (for example #A2) at its one side is made different from the interval between that and the incident ends 7b of the second optical output waveguides 6 (for example #B2) adjacent to the first optical output waveguides 6 (for example #A2) at its other side.

Also in the second preferred embodiment, the first optical output waveguides 6 (#A1, #A2, #A3, . . . ) and the second optical output waveguides 6 (#B1, #B2, #B3, . . . ) are alternately provided as in the first preferred embodiment. And, the incident ends 7a of the first optical output waveguides 6 are arrayed at equal pitches, and the incident ends 7b of the second optical output waveguides 6 are also arrayed at equal pitches. These array pitches Δx are 40 μm.

The second optical output waveguides 6 (#B1, #B2, #B3,) are formed at the left side in the drawing with the array pitch δx=15 μm with respect to the corresponding first optical output waveguides 6 (#A1, #A2, #A3, . . . ). Therefore, for example, the second optical output waveguide 6 (#B2) corresponding to the first optical output waveguide 6 (#A2) is arrayed at a pitch of 15 μm at the left side of the first optical output waveguide 6 (#A2), and the second optical output waveguide 6 (#B1) is arrayed at a pitch of 25 μm at the right side of the first optical output waveguide (#A2). The interval s between the incident ends 7a of the first optical output waveguides (#A1, #A2, #A3, . . . ) and the incident ends 7b of the corresponding optical output waveguides 6 (#B1, #B2, #B3, . . . ) is 8.5 μm.

As regards the array pitch of the outgoing ends 8 of the first optical output waveguides 6 and the outgoing ends of the second optical output waveguides 6, for example, as the array pitch of the outgoing ends 8 of the first optical output waveguides 6 (#A1) and the outgoing ends 8 of the second optical output waveguide 6 (#B1) corresponding to the first optical output waveguide (#A1) is 100 μm, the pitch between the outgoing ends 8 of the first optical output waveguides 6 and the outgoing ends 8 of the second optical outgoing ends 8 corresponding thereto constitutes 100 μm. Also, as in the first preferred embodiment, the array pitches of the outgoing ends 8 of the first optical output waveguides are 250 μm while the pitches of the outgoing ends 8 of the second optical output waveguides 6 constitute 250 μm.

The second preferred embodiment is constructed as described above. The second preferred embodiment operates almost as the first preferred embodiment does, and can bring about almost the same effects as those of the first embodiment.

Also, in the preferred embodiment, as described above, since the pitch between the incident end 7a of the first optical output waveguide 6 and the incident end 7b of the second optical output waveguide 6 adjacent to the first optical output waveguide 6 at one side thereof is 15 μm, and the pitch between that and the incident end 7b of the second optical output waveguide 6 adjacent to the first optical output waveguide 6 at the other side thereof is 25 μm, products can become "passed products" even though the abovementioned deviation in wavelengths is in a range from +0.3±0.05 n to −0.5±0.05 nm. Therefore, the probability at which products can pass becomes 27.2% at the standard deviation σ=0.2 nm which is the normal distribution. As a result, in comparison with the prior art examples, it is possible to improve the production yield by 7.5%.

Figure 5:
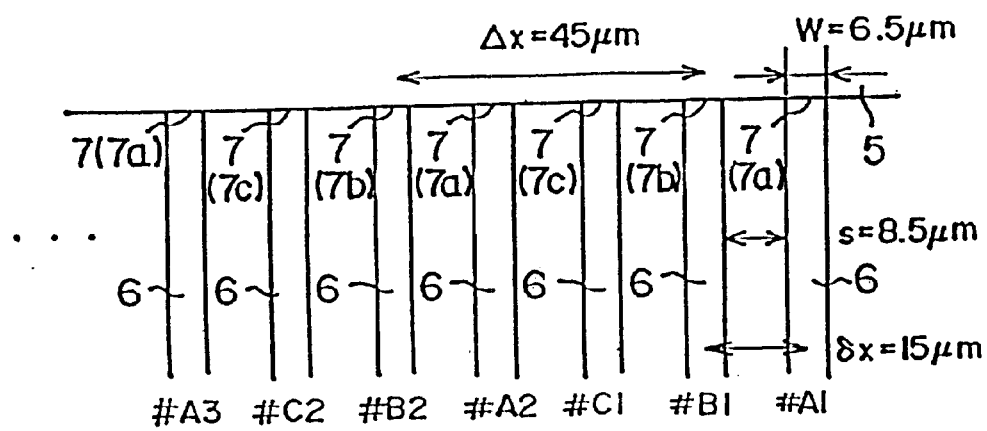
FIG. 5 is an explanatory view of the array conditions of an optical output waveguides 6 according to a third preferred embodiment of an optical output multiplexing and dividing device according to the invention.
Figure 7:
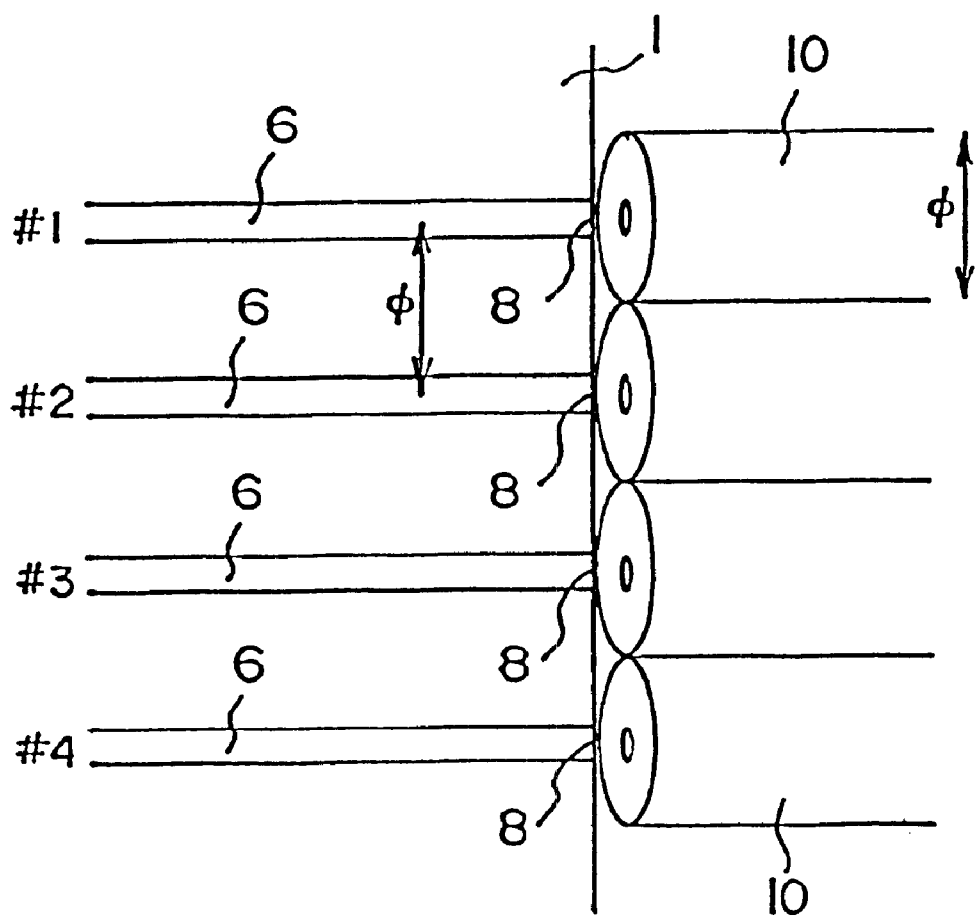
FIG. 7 is an explanatory view showing a method for connecting optical fibers for optical output to a prior art optical wavelength multiplexing and dividing device illustrated in FIG. 6.

Next, a description is given of the third preferred embodiment of an optical wavelength multiplexing and dividing device according to the present invention. The third preferred embodiment is constructed in almost the same manner as in the first preferred embodiment. A feature in that the third preferred embodiment differs from the first preferred embodiment is, as shown in FIG. 5, that a plurality of the second optical output waveguides 6 (#B1, #B2 , . . . , #C3, #C4, . . . ) are arrayed between pitches of the first optical output waveguides (#A1, #A2, #A3, . . . ) in which the incident ends 7a are arrayed at equal pitches (Δx=45 μm).

Further, in the third preferred embodiment, the second optical output waveguides 6 are such that optical output waveguides 6 indicated by #B and those indicated by #C are alternately arrayed, and the incident ends 7b of the optical output waveguides 6 indicated by #B are arrayed at equal pitches (Δx=45 μm). Also, array pitches δx of incident ends 7a, 7b, and 7c adjacent to each other of the optical output wavegiudes 6 indicated by #A, #B and #C becomes 15 μm. Still further, pitches of the incident ends 7a, 7b, and 7c adjacent to each other of the optical output waveguides 6 indicated by #A, #B and #C become 8.5 μm.

Also, the array pitch of the outgoing ends 8 of the first optical output waveguides (#A1, #A2, #A3, . . . ) is 250 μm, the array pitch of the outgoing ends 8 of the second optical output waveguides 6 indicated by #B is 250 μm, and the array pitch of the outgoing ends 8 of the second optical output waveguides 6 indicated by #C is 250 μm. In addition, the pitches between the outgoing ends 8 of the first optical output waveguides 6 (#A1, #A2, #A3, . . . ) and the outgoing ends 8 of the second optical output waveguides 6 (#B1, #B2, #B3, . . . ) are approx. 80 μm, and the pitches between the outgoing ends 8 of the first optical output waveguides 6 (#A1, #A2, #A3, . . . ) and the outgoing ends 8 of the second optical output waveguides 6 (#C1, #C2, #C3, . . . ) are approx. 160 μm.

In other words, the array pitches adjacent to each other of the optical output array waveguides 6 indicated by #A, #B and #C are made into approx. 80 μm, which is one-third of the diameter of optical fibers connected to the outgoing ends 8 of the optical output waveguides 6.

The third preferred embodiment is constructed as described above, whereby the third preferred embodiment operates in almost the same manners as the first and second preferred embodiments and can bring about the same effects.

Also, in the third preferred embodiment, as described above, a plurality of the second optical output waveguides 6 (#B1, #B2, . . . , #C3, #C4, . . . ) are arrayed in the array pitches of the incident ends 7a of the first optical output waveguides 6, the array pitches δx of the adjacent incident ends 7a, 7b, and 7c of the optical output waveguides 6 indicated by #A, #B and #C are 15 μm. Therefore, if the deviation in wavelengths is in a range from +0.27±0.05 nm to −0.53±0.05 nm, the light passed through the output side slab waveguide 5 is made incident into the second optical output waveguides 6 indicated by #B, and if the deviation in wavelengths is in a range from −0.27±0.05 nm to +0.53±0.05 nm, the light passed through the output side slab waveguide 5 is made incident into the second optical output waveguides 6 indicated by #C.

Therefore, in the normal distribution in which the standard deviation is σ=0.2 nm, the probability at which products can pass becomes 37.5%, whereby in comparison with the prior art examples, it is possible to improve the production yield ratio by 17.8%.

Further, the invention is not limited to the respective embodiments described above, and may be subjected to various modifications in the embodiment. For example, the array pattern and array intervals in the first and second optical output waveguides 6 need not to be as in the above preferred embodiments. The invention may be embodied in that the respective incident ends 7a of a plurality of the first optical output waveguides 6 are formed at a light condensing predicted position where light is predicted to be condensed through the output side slab waveguide 5, and the respective incident ends 7 (for example, 7b and 7c) of the second optical output waveguides 6 are provided at a light condensing prediction corrected position where the light condensing position is shifted with respect to the light condensing predicted position.

In addition, the array pitches of the outgoing ends 8 of the optical output waveguides 6 are not limited to those in the respective preferred embodiments. The pitches may be adequately established.

However, if, as in each of the preferred embodiments, the array pitches of the outgoing ends 8 of the first optical output waveguides 6 are made into almost the same value as the diameter of optical fibers 10 connected to the outgoing ends 8 side, as in the first and second preferred embodiments, the array pitches of the outgoing ends 8 of the second optical output waveguides 6 of the #B group are made into almost the same value as the diameter of the abovementioned optical fibers 20, and as in the third preferred embodiment, the array pitches of the outgoing ends 8 of the optical output waveguides 6 in the #B and #C groups are made into almost the same diameter of the abovementioned optical fibers 20, it is possible to very easily connect the optical fibers 10 by shifting optical fiber arrays in which the optical fibers 10 are juxtaposed, as shown in, for example, FIG.3, when connecting the optical fibers 10 to the optical wavelength multiplexing and dividing device, corresponding to channels of light to be outputted (that is, through which optical output waveguides 6 the light is outputted).

Still further, in the respective preferred embodiments, although the width of the optical output waveguides 6 is made into 6.5 μm, there is no special limitation in the width of optical output waveguides 6, the size of an optical wavelength multiplexing and dividing device, etc., whereby they may be adequately established.

Still further, an optical wavelength multiplexing and dividing device, according to the respective preferred embodiments, is made into an optical component before connecting optical fibers 10. However, the optical wavelength multiplexing and dividing device, according to the invention, may be made into an optical component in which optical fibers 10 are connected to a waveguide chip as shown in the respective optical wavelength multiplexing and dividing devices.

Industrial Applicability

As described above, an optical multiplexing and dividing device, according to the invention, is used as an array waveguide lattice type device which separates and picks up wavelength-multiplexed signals in optical transmission systems, etc., in particular, faults in production resulting from unevenness in the film thickness of waveguides, waveguide widths, and refractive indexes, etc., are eliminated, whereby the production yield can be improved.

What is claimed is:

1. An optical wavelength multiplexing and dividing device, having a waveguide pattern in which a first slab waveguide is connected to the outgoing side of one or more juxtaposed optical input waveguides, a plurality of juxtaposed array waveguides of different lengths, which propagate light introduced from said first slab waveguide, are connected to the outgoing side of said first slab waveguide, a second slab waveguide is connected to the outgoing side of said plurality of array waveguides, and a plurality of juxtaposed optical output waveguides are connected to the outgoing side of said second slab waveguide; wherein a plurality of signal light having wavelengths different from each other, which is inputted from one of said optical input waveguides, is caused to propagate with phase differences given as per wavelength by said array waveguides in order to make the signal light incident into optical output waveguides different from each other as per wavelength, and lights having wavelengths different from each other are outputted from different optical output waveguides, and wherein the respective incident ends of said plurality of optical output waveguides are provided at light condensing predicted positions of said respective wavelengths where lights are predicted to be condensed through said second slab waveguide, and at light condensing prediction corrected positions where the light condensing positions are shifted with respect to said light condensing predicted positions; and both said light condensing predicted positions and said light condensing prediction corrected positions are arranged, while having a same interval respectively therebetween such that an optical/electric field distribution of a wavelength of light condensed at one position of said light condensing predicted position and said light condensing prediction corrected position is not substantially coupled to that of light condensed at the other position thereof.

2. An optical wavelength multiplexing and dividing device as set forth in claim 1, wherein an array of pitches of the outgoing ends of the optical output waveguides are made into one fractional plurality with respect to the diameter of optical fibers connected to the outgoing ends of said optical output waveguides, and said optical fibers are connected to an alternative plurality of optical output waveguides, or several alternatives thereof.

3. An optical wavelength multiplexing and dividing device as set forth in claim 1, wherein, when optical output waveguides provided at the light condensing predicted positions are made into the first optical output waveguides, and optical output waveguides provided at the light condensing prediction corrected positions are made into the second optical output waveguides, the incident ends of these first and second optical output waveguides are alternately provided at equal pitches.

4. An optical wavelength multiplexing and dividing device as set forth in claim 2, wherein, when the optical output waveguides provided at the light condensing predicted positions are made into the first optical output waveguides, and the optical output waveguides provided at the light condensing prediction corrected positions are made into the second optical output waveguides, the incident ends of these first and second optical output waveguides are alternately provided at equal pitches.

5. An optical wavelength multiplexing and dividing device as set forth in claim 1, wherein, when the optical output waveguides provided at the light condensing predicted positions are made into the first optical output waveguides, and the optical output waveguides provided at the light condensing prediction corrected positions are made into the second optical output waveguides, the incident ends of these first and second optical output waveguides are alternately provided; the incident ends of said first optical output waveguides are mutually arrayed at equal pitches; the incident ends of said second optical output waveguides are mutually arrayed at equal pitches; and an interval between the incident ends of the first optical output waveguides and the incident ends of the second optical output waveguides adjacent thereto at one side thereof differs from the interval between the incident ends of the first optical output waveguides and the incident ends of the second optical output waveguides adjacent thereto at the other side thereof.

6. An optical wavelength multiplexing and dividing device as set forth in claim 2, wherein, when the optical output waveguides provided at the light condensing predicted positions are made into the first optical output waveguides, and the optical output waveguides provided at the light condensing prediction corrected positions are made into the second optical output waveguides, the incident ends of these first and second optical output waveguides are alternately provided; the incident ends of said first optical output waveguides are mutually arrayed at equal pitches; the incident ends of said second optical output waveguides are mutually arrayed at equal pitches; and an interval between the incident ends of the first optical output waveguides and the incident ends of the second optical output waveguides adjacent thereto at one side thereof differs from the interval between the incident ends of the first optical output waveguides and the incident ends of the second optical output waveguides adjacent thereto at the other side thereof.

7. An optical wavelength multiplexing and dividing device as set forth in claim 1, wherein, when the optical output waveguides provided at the light condensing predicted positions are made into the first optical output waveguides, and the optical output waveguides provided at the light condensing prediction corrected positions are made into the second optical output waveguides, the incident ends of the first optical output waveguides are mutually arrayed at equal pitches, and a plurality of the second optical output waveguides are arrayed in the pitches of said first optical output waveguides.

8. An optical wavelength multiplexing and dividing device as set forth in claim 2, wherein, when the optical output waveguides provided at the light condensing predicted positions are made into the first optical output waveguides, and the optical output waveguides provided at the light condensing prediction corrected positions are made into the second optical output waveguides, the incident ends of the first optical output waveguides are mutually arrayed at equal pitches, and a plurality of the second optical output waveguides are arrayed in the pitches of said first optical output waveguides.

* * * * *